Patented Jan. 15, 1924.

1,480,589

UNITED STATES PATENT OFFICE.

JOSEF WONDRUSCHKA AND STANLY DUDA, OF NEW YORK, N. Y.

CUTTING OIL.

No Drawing.  Application filed December 4, 1922.  Serial No. 604,746.

*To all whom it may concern:*

Be it known that we, JOSEF WONDRUSCHKA and STANLY DUDA, citizens of Austria and Czechoslovakia, respectively, and residents of New York, in the county of New York and State of New York, have invented certain new and useful Improvements in Cutting Oils, of which the following is a specification.

The main object of this invention is the provision of an oil compound useful in drilling or milling iron and steel, which is efficient in service and relatively inexpensive in cost of manufacture.

Our cutting oil as below described possesses the property of being unusually adhesive to the material being operated upon, and it preserves the material and the cutting tool against rusting.

Our compound is composed of the following ingredients: cotton seed oil, tallow, common alkaline soap in the soft plastic state, and water. These materials are mixed in the proportion by volume of two parts of cotton seed oil, two parts of tallow, one part of soap, and two parts of water, and the whole is then thoroughly mixed and boiled until the resultant mixture resembles a thick grease. In this form the compound may be provided for the market, and before using it is mixed with hot water and stirred thoroughly in the proportion of one pound of grease with three gallons of water. The fluid thus used will be found to possess the distinct qualities above-mentioned.

We claim:—

A cutting oil composed by volume of two parts of cotton seed oil, two parts of tallow, one part of plastic soap, all thoroughly mixed and boiled in two parts of water, until the resultant product resembles a thick grease, and an additional amount of hot water thoroughly mixed with said grease in the proportion of one pound of grease to three gallons of hot water.

Signed at New York in the county of New York and State of New York, this 16th day of September, A. D. 1922.

JOSEF WONDRUSCHKA.
STANLY DUDA.